3,503,845
POLYESTER TEXTILE TO RUBBER LAMINATE AND METHOD OF MAKING SAME

Richard G. Hollatz, Detroit, and Allan R. Williams, Grosse Pointe Park, Mich., assignors to Uniroyal, Inc., a corporation of New Jersey
No Drawing. Filed Feb. 23, 1967, Ser. No. 617,808
Int. Cl. B32b 27/38
U.S. Cl. 161—184         17 Claims

ABSTRACT OF THE DISCLOSURE

Bonding polyester textiles, containing the dried deposit of an epoxy resin and a blocked isocyanate, to a rubber containing a methylolated nitroalkane and a resorcinol-type methylene acceptor, by applying the rubber as a calendered solid to the textile material. The assembly is then heated to vulcanize the rubber into a permanent bonded relationship with the polyester textile.

---

This invention relates to improvements in the methods of adhering textile materials to rubber and to the improved laminates so obtained.

In certain rubber articles designed to withstand considerable stress in use the rubber is reinforced with plies of comparatively inextensible materials. Thus, rubber hose, belts and tires are commonly reinforced with filamentary textiles in the form of yarns, cords or fabric. In such articles, it is important that the plies of textile reinforcing material be firmly adhered to the rubber intermediate the textile plies and remain effectively adhered even after the article has been subjected to repeated varying strains in use, because any separation and relative movement of the rubber and textile parts leads to abrasion between these parts and consequent failure.

In order to improve the adhesion of the textile material to the rubber intermediate the textile plies, it is common practice to first apply a deposit of rubber on the textile material, such as a tire cord fabric, by passing the textile material through a bath of an aqueous dispersion of rubber, such as a rubber latex composition, as in a so-called "solutioning" treatment, and drying. The rubber latex "solutioning" composition preferably contains a resin, e.g., a fusible partially reacted resorcinol-formaldehyde resin, such as a condensate of resorcinol and formaldehyde in the ratio of 1 mole of resorcinol to about 0.5 to 0.8 mole of formaldehyde, and formaldehyde or a formaldehyde-yielding agent which on subsequent heating (as during vulcanization of the rubber intermediate the textile plies) cures the fusible resin to an infusible state.

In accordance with the present invention, it has been found that the adhesion of polyester cords to rubber may be greatly improved by a unique combination of steps. Firstly, the polyester fiber must be conditioned by pre-dipping in a composition, hereinafter defined, prior to the conventional "solutioning" treatment described above. A single or double dip may be used. Secondly, the solid rubber must have incorporated therein a "nitroalcohol," and a "resorcinol type methylene acceptor."

The conditioning of the polyester fiber is accomplished by passing the textile material through an aqueous dispersion of an epoxy resin and a blocked isocyanate.

The epoxy resins which may be used have a molecular weight between 200 and 2000, are liquids at the finishing temperatures, are insoluble in water, and have an epoxide equivalent between about 130 and 1000.

An example of such resins is Epon Resin 812 (Shell Chemical Company), a mixture of di- and tri-epoxides prepared by the condensation of epichlorohydrin and glycerin. This material has an epoxide functionality of 2.2, about 10% tightly bound chlorine, an average molecular weight of about 306, an equivalent weight (g. resin to esterify one mole of acid) of 65, and a viscosity at 25° C. of 0.9–1.5 poises.

Others include those derived from bisphenol A, e.g., Epon 1002, Epon 1004 (Shell Chemical Company) and Araldite 6084 (Ciba Co.); epoxylated novolaks, e.g., Kopox 955A and Kopox 997A which have molecular weights of 885 and 1270, respectively (Koppers Co.).

The blocked isocyanate must form the isocyanate group at the finishing temperatures. The blocking group, which is most commonly a phenol, but which may also be a caprolactam, serves to prevent reaction with water. The isocyanates are at least difunctional and have a molecular weight between 100 and 500.

Examples of such a material are: The bisphenol adduct of methylene bis(4-phenyl isocyanate) having a molecular weight of 439 and sold as "Hylene" MP (E. I. du Pont), the bisphenol adduct of m-phenylene diisocyanate; and the bis-caprolactam adduct of toluene-2,4-diisocyanate sold as "Hylene" T (E. I. du Pont).

The following table sets forth the broad and preferred ranges of the components in the pre-dip.

TABLE A

|  | Percent in Aqueous Dispersion | |
|---|---|---|
|  | Broadly | Preferred |
| Epoxy resin | 0.7–3 | 1.3–2 |
| Isocyanate | 1.4–7 | 2.7–4 |
| Percent solids | 2–10 | 4–6 |

Conventional amounts of surfactants are also present.

In practice, the polyisocyanate is admixed with water in the presence of a surfactant to form a slurry. Thereafter the slurry is admixed with additional water and the epoxy resin.

Dipping is most conveniently performed at room temperature. Where a double dip is used the first dip pick up is about ½% solids. In either the single or double dip the total solid in the solution is about 8%, broadly from 3 to 8%.

After the polyester fiber is dipped it is dried at a temperature of from 375 to 480° F., preferably from 390 to 450° F., for a period of ½ to 6 minutes, preferably 1 to 3 minutes.

The dried pre-dipped fiber is thereafter "solutioned" in the conventional latex cord solution as hereinafter described.

(1) The "nitroalcohols" incorporated in the rubber may be generically defined as methylolated nitroalkanes wherein the hydrocarbon radical has 1 to 6 carbon atoms. Examples are: trimethylolnitromethane, 1,1-dimethylol-1-nitroethane, 1,1-dimethylol-1-nitropropane, 2-methylol-2-nitropropane, tris(acetoxymethyl)nitromethane, 1,1-bis (acetoxymethyl)-1-nitroethane or 1,1-bis(acetoxymethyl)-1-nitropropane.

(2) The "resorcinol type methylene acceptors" include: resorcinol or other meta disubstituted benzene in which each of the substituents is an OH, $NH_2$ or $OCOCH_3$ radical (e.g., m-aminophenol, m-phenylenediamine, resorcinol monoacetate, resorcinol diacetate), or 1,5-naphthalenediol, or a fusible partially reacted resorcinol-carbonyl compound (having from 1 to 6 carbon atoms) resin, such as resorcinol-formaldehyde resin (condensate of resorcinol and formaldehyde in the ratio of one mole of resorcinol to about 0.5 to 0.8 mole of formaldehyde), or a condensation product of resorcinol and acetone (condensate of resorcinol and acetone in the ratio of one mole of resorcinol to about 0.5 to 2 moles of acetone), or a condensation product of resorcinol and acetaldehyde (condensate of resorcinol and acetaldehyde in the ratio of one mole of resorcinol to about 0.5 to 1 mole of acetaldehyde), or a condensation product of resorcinol and formaldehyde and butyraldehyde. Such fusible partially reacted resorcinol-formaldehyde resins and those used in the above mentioned latex "solutioning" compositions may be prepared in known manner by heating a concentrated aqueous solution of the resorcinol and formaldehyde, with or without a catalyst such as oxalic acid. The Ball and Ring softening point (ASTM designation E 28–58T) of such fusible partially reacted resins will generally be from about 60° C. to 120° C. Such resorcinol-acetone condensates, which are white powders, may be prepared in known manner by reacting the acetone and resorcinol in dilute hydrochloric acid solution at temperatures from 35° C. to 50° C. for several hours. Such resorcinol-acetaldehyde condensates, which are tacky reddish oils, may be prepared in known manner by reacting the acetaldehyde and resorcinol in dilute oxalic acid solution at 100° C., for several hours. The trimethylol-nitromethane and the other "nitroalcohols" are known compounds; see "Aldehyde-Nitroparaffin Condensation" by Vanderbilt et al., Ind. Eng. Chem. 32, 34–38 (1940). The nitroalcohol and the resorcinol-type resin will react on heating, as in the vulcanization of the rubber to form an infusible resin.

The rubber intermediate the textile plies may be applied in the usual manner by calendering a coating of a solid vulcanizable rubber composition containing the nitroalcohol and resorcinol-type resin on the textile material, generally on both sides, e.g., as in the conventional coating of tire cord fabric with tire carcass stock. The two ingredients may be mixed with the conventional compounding ingredients in the solid rubber in a Banbury mixer and the rubber composition then calendered on the textile material. After building the rubber-coated textile material into the finished article, e.g., a tire, the assembly is heated to vulcanize the rubber components thereof. The ratio of the nitroalcohol to the resorcinol-type methylene acceptor may vary from 0.4/1 to 4/1. The optimum amount depends on the stoichiometry of the particular components employed and is best ascertained empirically for each system. The amount of the ingredients mixed with the rubber is not critical. Generally 0.3 to 8 parts, and preferably 0.5 to 4 parts, of nitroalcohol and resorcinol-type methylene acceptor (total) per 100 parts of the rubber will be mixed in the rubber compound to be calendered on the textile material.

The solid rubber used in the present invention for making the rubber and fabric laminates for use in tire manufacture and for other purposes may be sulfur vulcanizable natural (Hevea) rubber or conjugated diolefin polymer synthetic rubber or mixtures of any of them including their reclaims.

The aqueous dispersion of rubber, when used for "solutioning" the textile material before plying with the solid rubber composition, may be natural rubber latex, or a latex of conjugated diolefin polymer synthetic rubber, or mixtures thereof, or an aqueous dispersion of reclaim from such rubbers, or mixtures of any of such latices and reclaim dispersions.

Such conjugated diolefin polymer synthetic rubbers are polymers of butadienes-1,3, e.g., butadiene-1,3, isoprene, 2,3-dimethyl-butadiene-1,3, and copolymers of mixtures thereof, and copolymers of mixtures of one or more such butadienes-1,3, with one or more other polymerizable compounds which are capable of forming rubbery copolymers with butadienes-1,3, for example, up to 60% by weight of such mixture of one or more monoethylenic compounds which contains a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefins, such as styrene, vinyl toluene, alpha methyl styrene, chlorostyrene, dichlorostyrene, vinyl naphthalene; and the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone. Examples of such conjugated diolefin polymer synthetic rubbers are polybutadiene, polyisoprene, butadiene-styrene copolymers (SBR) and butadiene-acrylonitrile copolymers.

The rubber intermediate the plies will also contain conventional compounding and vulcanizing ingredients such as carbon black, rubber processing or softening oils which may be added as such or may be present from oil-extended rubbers, antioxidants, sulfur, zinc oxide and accelerators. Most preferably, accelerators which do not yield amine-type degradation products are used. These include the thiazoles, e.g., benzothiazyl disulfide, 2-mercapto benzothiazole; thiazolines, e.g., 2-mercapto-triazoline. Sulfenamides and (di) thiocarbamates are conventional accelerators which can be used but are not preferred.

The following examples illustrate the invention. All parts and percentages referred to herein are by weight.

EXAMPLE 1

A polyester tire cord (Dacron T–68, 840/2) was pre-dipped in a solution which was prepared by mixing 334.80 parts of an isocyanate slurry with 1302.56 parts of water and 17.08 parts of an epoxy resin, (Epon Resin 812). The isocyanate slurry was prepared by admixing 426 parts of water with 9 parts of Darvan 1 (an anionic surfactant obtained from R. T. Vanderbilt) and a phenol-blocked isocyanate (Hylene MP). This cord was dried at a temperature of 400° F. for 2 minutes and then at 0.5 minute.

After the pre-dipped tire cord was dried it was dipped in a conventional resorcinol-formaldehyde vinyl pyridine latex cord solution. This "solutioning bath" consists of 20 parts solids of a latex of a terpolymer of 70 parts of butadiene and 15 parts of vinyl pyridine and 15 parts of styrene and 8 parts of a commercial partially reacted resorcinol-formaldehyde resin (ratio of 1 mole of resorcinol to about 0.6 to 0.8 mole of formaldehyde).

The solutioned cord was dried at a temperature of 400° F. for 2 minutes.

In order to illustrate the invention, a natural rubber compound was prepared by admixing 100 parts of the natural rubber with 40 parts of carbon black, 5 parts of zinc oxide, 1.5 parts of stearic acid, 7.5 parts of pine tar softener, 2.5 parts of antioxidant BLE (condensation product of acetone and diphenylamine) 0.25 part of antioxidant JZF (N,N'-diphenyl-p-phenylenediamine), 0.65 to 0.7 part of accelerator SNS (N-tertiary-butyl-2-benzothiazole-sulfenamide), and 0.75 part of sulfur.

To the above natural rubber stock varying amounts of a resorcinol resin and a nitroalcohol were added. The stock was cured for 45 minutes at 2940 F. and the following results obtained in the H-adhesion test at 250° F.:

TABLE I

| | Resin level, phr. | H-Adhesion, 250° |
|---|---|---|
| Nitroalcohol level, phr.: | | |
| | | 18.5 |
| 2.00 | 1.00 | 22.1 |
| 2.50 | 1.0 | 22.5 |
| 2.50 | 1.5 | 22.4 |

All the H-adhesion values are the average of 3 "pulls." This test is described in Ind. Rub. World, vol. 114, page 213 (1946) "Study of the 'H' test for evaluating the adhesion properties of tire cord in natural and GR–S rubber" and in ASTM designation D2138–62T. The resin was a thermoplastic resorcinol-formaldehyde resin and the nitroalcohol was trishydroxymethylnitromethane (trimethylolnitromethane).

The above data clearly indicate that the addition of the resin and the nitroalcohol resulted in a marked improvement of the H-adhesion. This is demonstrated at a resorcinol resin level of from 1.0 to 1.5 parts per 100 parts of rubber and a nitroalcohol level of from 2.00 to 2.5 parts per 100.

EXAMPLE 2

A rubber compound was prepared by mixing 35 parts of natural rubber, 20 parts of cis-1,4-polybutadiene, 67.50 parts of an oil-extended styrene-butadiene rubber, 55 parts of carbon black, 10 parts of zinc oxide, 1 part of stearic acid, 7.5 parts of pine tar oil, 0.50 part of an antioxidant (a low temperature reaction product of phenylbetanaphthylamine and acetone) and 3 parts of sulfur. Samples of these rubbers were further compounded with resorcinol-formaldehyde resins and trimethylolnitromethane in accordance with the teaching of the instant invention. H-adhesion tests were made after curing the stock for 45 minutes at 293° F. using a polyester cord treated as described in Example 1.

PART A

Using an accelerator system consisting of N-cyclohexyl-2-benzothiazole sulfenamide (CBS) and diphenylguanidine (DPG). Table IIA shows the results obtained.

TABLE IIA

| Nitroalcohol level, phr. | Resin level, phr. | Acceleration Type | Level, phr. | H-Adhesion, 250°, pounds |
|---|---|---|---|---|
| | | CBS/DPG | 0.8/0.2 | 16.3 |
| 3.00 | 0.75 | CBS/DPG | 0.8/0.2 | 18.6 |
| 3.00 | 1.25 | CBS/DPG | 0.8/0.2 | 20.4 |
| 2.00 | 0.75 | CBS/DPG | 0.8/.15 | 19.0 |
| 1.00 | 1.25 | CBS/DPG | 0.8/.15 | 20.9 |

The above table clearly shows improvements in H-adhesion obtained by the addition of the nitroalcohol and resin. Additionally, it is clearly evident that a reduction of the DPG level from 0.2 to 0.15 was beneficial to the adhesion. Even at lower nitroalcohol levels improved H-adhesion was obtained as compared to the compositions containing higher levels of the amine type accelerator.

PART B

Using a different accelerator system, namely benzothiazyl disulfide (MBTS) with the diphenylguanidine (DPG), additional samples were tested. In this example results were also obtained with aged stock. The aging time and temperatures are indicated in the table:

TABLE IIB

| Nitro-alcohol level, phr. | Resin level, phr. | Acceleration Type | Level, phr. | H-Adhesion, 250° F. Green, pounds | 48 hrs. at 212°, pounds | 2 hrs. at 350°, pounds |
|---|---|---|---|---|---|---|
| | | MBTS/DPG | 0.7/0.2 | 16.0 | 11.9 | 6.4 |
| 2.00 | 0.75 | MBTS | 1.05 | 24.1 | 17.3 | 11.7 |
| 2.00 | 0.75 | MBTS/DPG | 1.05/0.15 | 23.3 | 15.6 | 12.0 |
| 2.50 | 1.00 | MBTS | 1.05 | 22.2 | 16.6 | 11.5 |
| 2.50 | 1.00 | MBTS/DPG | 1.05/0.15 | 22.3 | 15.5 | 11.4 |
| 2.00 | 1.25 | MBTS | 1.05 | 22.7 | 18.3 | 13.2 |
| 2.00 | 1.25 | MBTS/DPG | 1.05/0.15 | 22.8 | 17.7 | 12.5 |

The above data show the particularly outstanding improvement obtained upon the addition of the nitroalcohol-resin combination of the invention where the H-adhesion tests are obtained after aging. Furthermore, this table shows the advantage of using a non-amine accelerator system. Different accelerator levels are used because of the retardation caused by the nitroalcohol. The above levels give comparable curing rates.

PART C

In the following table the synthetic rubber/natural rubber stock described in Part A was formulated with high MBTS accelerator levels, namely 2.25 phr. The sulfur level was 1.25 phr. In the second and last runs set forth in the following table 0.2 phr. of DPG was also present as accelerators.

TABLE IIC

| Resin level, phr. | H-Adhesion, 250° F. Green, pounds | 48 hrs. at 212°, pounds | 2 hrs. at 350°, pounds |
|---|---|---|---|
| | 12.0 | 12.7 | 7.5 |
| Nitroalcohol level, phr.: | | | |
| 1.0 — 0.75 | 23.4 | 21.5 | 19.3 |
| 1.0 — 0.75 | 23.0 | 19.8 | 14.2 |
| 2.0 — 0.75 | 23.2 | 19.8 | 17.1 |
| 1.0 — 1.25 | 22.5 | 21.9 | 17.3 |
| 2.0 — 1.25 | 23.4 | 21.9 | 16.9 |
| 2.0 — 1.25 | 23.3 | 21.1 | 18.7 |

The above table clearly shows the improved adhesivity of the stock containing a nitroalcohol-resorcinol resin combination. This stock maintained outstanding H-adhesion values even after severe aging test. The best adhesion results are obtained using 1.0 to 2.0 parts of the nitroalcohol with 0.75 to 1.25 parts of the resorcinol-formaldehyde resin. Also, the data indicate that the highest level of resorcinol-type resin is somewhat better for adhesion after aging.

EXAMPLE 3

A series of passenger tires were built using a carcass stock containing trimethylolnitromethane, and, for purposes of comparison, one containing another methylene donor, viz, 1-aza-5-methylol - 3,7 - dioxabicyclo [3.3.0] octane described in U.S. Patent 3,256,137. Transverse sections, one inch wide, were cut from the cured tires and the adhesion determined by drawing the tread and the top ply of the carcass apart at a rate of 12 inches per minute. The composition of the four groups of stock prepared in this test are shown in the following table:

TABLE IIIA

| | Methylene donor level, phr. | | Resin level, phr. | Acceleration | | Sulfur level, phr. |
|---|---|---|---|---|---|---|
| | Bicyclo-octane | Nitro-alcohol | | Type | Level, phr. | |
| Group: | | | | | | |
| 1 | 1.25 | | 2.4 p.p.h. | CBS/DPG | 0.8/0.2 | 3.25 |
| 2 | 1.25 | | 2.4 p.p.h. | MBTS/DPG | 2.5/0.2 | 1.25 |
| 3 | | 3.00 | .75 | CBS/DPG | 1.5/0.3 | 3.00 |
| 4 | | 2.00 | .75 | MBTS/DPG | 1.4/0.3 | 3.00 |

The adhesion of the tire carcass plies using a strip adhesion test at 250° F., expressing results in pounds pull per inch of width, is shown in the following table:

TABLE IIIB

| | Aging | | | | | |
|---|---|---|---|---|---|---|
| | None | None | None | None | 2 hrs. at 350° F. | 4 hrs. at 350° F. |
| | Cure time at 330° F., min. | | | | | |
| | 6 | 8 | 12 | 20 | 20 | 20 |
| | Adhesion, lbs./in. of Width | | | | | |
| 1 | 26.25 | 23.25 | 19.5 | 12.25 | 8.75 | 8.25 |
| 2 | 24.5 | 21.0 | 25.5 | 23.0 | 13.5 | 11.0 |
| 3 | 22.0 | 23.75 | 24.75 | 22.75 | 15.75 | 12.75 |
| 4 | 31.0 | 30.25 | 25.0 | 23.25 | 18.25 | 17.75 |

The above table clearly shows that the carcass formed in accordance with the invention has particularly outstanding strip adhesion values after the aging tests. The optimum amount of methylene donor may be readily determined by those skilled in the art.

As a further test of tire cord adhesion, a number of strip adhesion pads were "built" using the calendered fabric which was made up of the carcass stocks formulated as shown in the first paragraph of Example 2. The tire section adhesion test was performed on a Scott tensile tester at 250°. The following results, representing average values, were obtained:

TABLE IIIC

| Groups: | Lbs. pull/in. |
|---|---|
| 1 | 19.0 |
| 2 | 33.0 |
| 3 | 37.0 |
| 4 | 45.5 |

The above test conclusively shows the improved adhesison obtained with the tire sectioin prepared in accordance with the invention. The superiority of the Group 4 materials over the Group 3 materials shows the result of the accelerator employed. The Group 4 system uses an accelerator that does not form an amine-type degradation product.

EXAMPLE 4

To show the effectiveness of other nitroalcohols, a test piece consisting of a square-woven backing fabric, liner stock, two plies of calendered tire fabric at forty-five degrees, alternately, from right to left of the centerline of the specimen and a hot-recoated passenger tread stock was prepared. Vulcanization was carried out by heating for 12 minutes at 350° F. The stock and fabric are the same as those used in Example 2. The following tables show the results obtained from a strip adhesion test at 250° F. using various nitroalcohol-accelerator combinations: Using 1,1 - dimethylol - 1 - nitroethane the following results were obtained:

TABLE IVA

| Nitro-alcohol Amount, phr. | Resin level, phr. | Acceleration Type | Level, phr. | Strip adhesion, #/In. |
|---|---|---|---|---|
| | | MBTS/DPG | .85/.15 | 17.0 |
| 1.5 | 1.5 | MBTS/DPG | 1.30/.25 | 46.5 |
| 1.5 | 2.5 | MBTS/DPG | 1.40/.30 | 55.8 |
| 2.0 | 2.0 | MBTS/DPG | 1.40/.30 | 42.5 |
| 2.5 | 1.5 | MBTS/DPG | 1.50/.35 | 40.7 |
| 2.5 | 2.5 | MBTS/DPG | 1.50/.40 | 53.3 |

Using 2-methylol-2-nitropropane these results were obtained.

TABLE IVB

| Nitro-alcohol Amount, phr. | Resin level, phr. | Acceleration Type | Level, phr. | Strip adhesion, #/In. |
|---|---|---|---|---|
| 1.5 | 1.5 | MBTS/DPG | 1.2/.25 | 91.8 |
| 1.5 | 2.5 | MBTS/DPG | 1.25/.25 | 91.3 |
| 2.0 | 2.0 | MBTS/DPG | 1.30/.25 | 106.4 |
| 2.5 | 1.5 | MBTS/DPG | 1.40/.25 | 99.4 |
| 2.5 | 2.5 | MBTS/DPG | 1.45/.25 | 110.7 |

And, thirdly, using 1,1-dimethylol-1-nitropropane the results were as follows:

TABLE IVC

| Nitro-alcohol Amount, phr. | Resin level, phr. | Acceleration Type | Level, phr. | Strip adhesion, #/In. |
|---|---|---|---|---|
| 1.5 | 1.5 | MBTS/DPG | 1.30/.25 | 66.9 |
| 1.5 | 2.5 | MBTS/DPG | 1.4/.30 | 31.8 |
| 2.0 | 2.0 | MBTS/DPG | 1.4/.30 | 26.6 |
| 2.5 | 1.5 | MBTS/DPG | 1.5/.35 | 47.0 |
| 2.5 | 2.5 | MBTS/DPG | 1.6/.40 | 31.8 |
| 1.5 | 1.5 | MBTS/Tuex | 1.5/.20 | 106.1 |
| 1.5 | 2.5 | MBTS/Tuex | 1.5/.25 | 100.1 |
| 2.0 | 2.0 | MBTS/Tuex | 1.5/.25 | 87.4 |
| 2.5 | 1.5 | MBTS/Tuex | 1.5/.30 | 89.3 |
| 2.5 | 2.5 | MBTS/Tuex | 1.5/.35 | 99.0 |
| 1.5 | 1.5 | MBTS/DOTG | 1.5/.25 | 113.6 |
| 1.5 | 2.5 | MBTS/DOTG | 1.5/.30 | 102.2 |
| 2.0 | 2.0 | MBTS/DOTG | 1.5/.30 | 99.3 |
| 2.5 | 1.5 | MBTS/DOTG | 1.5/.35 | 93.5 |
| 2.5 | 2.5 | MBTS/DOTG | 1.5/.40 | 105.0 |

Finally, using 2-nitro-1-butanol, the results shown in Table IVD were obtained.

TABLE IVD

| Nitro-alcohol Amount, phr. | Resin level, phr. | Acceleration Type | Level, phr. | Strip adhesion, #/In. |
|---|---|---|---|---|
| 2.0 | 2.0 | MBTS/DPG | 1.4/.3 | 73.8 |
| 3.0 | 2.0 | MBTS/DPG | 1.5/.4 | 86.0 |
| 2.5 | 2.5 | MBTS/DPG | 1.45/.35 | 83.8 |
| 3.0 | 3.0 | MBTS/DPG | 1.4/.3 | 40.7 |
| 4.0 | 3.0 | MBTS/DPG | 1.5/.4 | 78.3 |

The above experiments show that all of the above methylolated nitroalkanes greatly enhance the adhesion. Particularly outstanding results are obtained by use of the 2-methylol-2-nitropropane and the 1,1 - dimethylol-1-nitropropane where benzothiazyl disulfide (MBTS) is used with tetramethylthiuram disulfide (Tuex) or diorthotolyl-guanidine (DOTG) for acceleration.

Having thus described our invention, what we claim and desire to protect by Letters Patent is:

1. In the method of laminating a polyester textile material and rubber by applying a solid vulcanizable rubber composition to a polyester textile material containing the dried deposit of an epoxy resin and a blocked isocyanate and heating the assembly to vulcanize the rubber, the step which comprises incorporating in the rubber before vulcanization a methylolated nitroalkane, said alkane having 1 to 6 carbon atoms and a resorcinol-type methylene acceptor.

2. The method of claim 1 wherein the methylolated nitroalkane is trimethylolnitromethane.

3. The method of claim 1 wherein the methylolated nitroalkane is trimethylolnitromethane, 1,1 - dimethylol-1-nitroethane, 1,1-dimethylol-1-nitropropane, 2-methylol-2-nitropropane, tris(acetoxymethyl) nitromethane, 1,1-bis (acetoxymethyl) - 1 - nitroethane or 1,1-bis(acetoxymethyl)-1-nitropropane.

4. The method of claim 1 wherein the resorcinol type methylene acceptor is resorcinol, m-aminophenol, m-phenylene diamine, resorcinol monoacetate, resorcinol diacetate, 1,5 - naphthalenediol or a partially reacted resorcinol-carbonyl compound resin wherein the carbonyl component has 1 to 6 carbon atoms.

5. The method of claim 1 wherein the rubber is natural Hevea rubber or a conjugated diolefin polymer synthetic rubber which is a polymer of butadiene-1,3-isoprene, 2,3-dimethyl butadiene-1,3, and mixtures thereof, and mixtures of such butadienes-1,3 with compounds which contain a $CH_2=C<$ group and which are copolymerizable with butadienes-1,3.

6. The method of claim 1 wherein the dried polyester textile material is passed through a bath of an aqueous dispersion of rubber and dried again prior to the application of the solid rubber vulcanizable composition.

7. The method of claim 1 wherein the polyester textile material is a tire cord fabric and the rubber is a tire carcass skim stock.

8. The method of claim 7 wherein the tire carcass skim stock contains trimethylolnitromethane and a partially reacted resorcinol-formaldehyde resin.

9. The method of claim 7 wherein the tire carcass skim stock contains trimethylolnitromethane and a condensation product of resorcinol and acetone.

10. The method of claim 7 wherein the tire carcass skim stock contains trimethylolnitromethane and a condensation product of resorcinol and acetaldehyde.

11. The method of claim 7 wherein the tire carcass skim stock contains 2-methylol-2-nitropropane and a partially reacted resorcinol-formaldehyde resin.

12. The method of claim 7 wherein the tire carcass skim stock contains 2-methylol-2-nitropropane and a condensation product of resorcinol and acetone.

13. The method of claim 7 wherein the tire carcass skim stock contains 2-methylol-2-nitropropane and a condensation product of resorcinol and acetaldehyde.

14. The method of claim 1 wherein the methylolated nitroalkane is 2-methylol-2-nitropropane.

15. A laminate of a polyester textile material containing the dried deposit of an epoxy resin and a blocked isocyanate and a calendered vulcanized rubber composition containing the reaction product of a methylolated nitroalkane and a resorcinol-type methylene acceptor.

16. The laminate of claim 15 wherein the calendered vulcanized rubber composition contains the reaction product of trimethylolnitromethane and a partially reacted resorcinol-formaldehyde resin.

17. The laminate of claim 15 wherein the calendered vulcanized rubber composition contains the reaction product of trimethylolnitromethane and a condensation product of resorcinol and acetone.

References Cited

UNITED STATES PATENTS

| | | | |
|---|---|---|---|
| 2,706,166 | 4/1955 | Gurney | 161—184 X |
| 2,906,717 | 9/1959 | Sekmakas | 260—2.5 |
| 3,036,948 | 5/1962 | Danielson | 156—330 |
| 3,226,276 | 12/1965 | Rye et al. | 156—335 |
| 3,364,100 | 1/1968 | Danielson | 161—248 X |
| 3,408,249 | 10/1968 | Brown | 161—248 X |
| 3,419,450 | 12/1968 | Krysiak | 161—184 X |
| 3,411,980 | 11/1968 | Leshin | 161—248 X |

HAROLD ANSHER, Primary Examiner

U.S. Cl. X.R.

156—330, 331, 335; 161—188, 190, 231, 248